(12) United States Patent
Ayers et al.

(10) Patent No.: US 11,277,091 B2
(45) Date of Patent: Mar. 15, 2022

(54) INTEGRATED PHOTOVOLTAIC MODULE MOUNTING SYSTEM FOR USE WITH TUFTED GEOSYNTHETICS

(71) Applicant: Watershed Solar LLC, Alpharetta, GA (US)

(72) Inventors: Michael R. Ayers, Johns Creek, GA (US); S. Kyle Ehman, Milton, GA (US); Neta Reef, Beit Elazari (IL); Sharone Zehavi, Cupertino, CA (US)

(73) Assignee: Watershed Solar LLC, Alpharetta, GA (US)

( * ) Notice: Subject to any disclaimer, the term of this patent is extended or adjusted under 35 U.S.C. 154(b) by 0 days.

(21) Appl. No.: 16/921,137

(22) Filed: Jul. 6, 2020

(65) Prior Publication Data

US 2021/0013826 A1 Jan. 14, 2021

Related U.S. Application Data

(63) Continuation of application No. 16/013,437, filed on Jun. 20, 2018, now abandoned.

(60) Provisional application No. 62/522,402, filed on Jun. 20, 2017.

(51) Int. Cl.
| | | |
|---|---|---|
| *H01L 31/042* | (2014.01) | |
| *H02N 6/00* | (2006.01) | |
| *H02S 20/10* | (2014.01) | |
| *H02S 20/30* | (2014.01) | |
| *H02S 40/22* | (2014.01) | |
| *E01C 13/08* | (2006.01) | |
| *F16B 5/02* | (2006.01) | |
| *D05C 17/02* | (2006.01) | |
| *H02S 30/10* | (2014.01) | |
| *F16M 11/22* | (2006.01) | |

(52) U.S. Cl.
CPC ............ *H02S 20/10* (2014.12); *D05C 17/026* (2013.01); *E01C 13/08* (2013.01); *F16B 5/02* (2013.01); *H02S 20/30* (2014.12); *H02S 30/10* (2014.12); *H02S 40/22* (2014.12); *F16M 11/22* (2013.01)

(58) Field of Classification Search
CPC .......... H02S 20/10; H02S 20/30; B09B 1/004
See application file for complete search history.

(56) References Cited

U.S. PATENT DOCUMENTS

| | | | |
|---|---|---|---|
| 4,226,256 A | 10/1980 | Hawley | |
| 7,682,105 B2 * | 3/2010 | Ayers | ..................... B09B 1/004 405/129.1 |
| 8,403,597 B2 | 3/2013 | Ayers et al. | |

(Continued)

OTHER PUBLICATIONS

AGRU America, Inc., [Sure Grip] Product Overview, printed from https://web.archive.org/web/20170615174655/http://agruamerica.com/products/sure-grip/, Jun. 15, 2017; AGRU America, Inc., Georgetown, SC 29440.

(Continued)

*Primary Examiner* — Angelo Trivisonno
(74) *Attorney, Agent, or Firm* — Baker Donelson; Carl M. Davis, II; Thomas A. Hodge

(57) ABSTRACT

An integrated photovoltaic module mounting system having a friction member for engagement with a portion of a tufted geosynthetic cover and optionally attaching connectors attached to a photovoltaic module and to the tufted geosynthetic cover, for collecting and utilizing solar energy. A method of securing a photovoltaic module to a tufted geosynthetic cover is disclosed.

18 Claims, 9 Drawing Sheets

(56) References Cited

U.S. PATENT DOCUMENTS

| | | | |
|---|---|---|---|
| 8,585,322 | B2 | 11/2013 | Ayers et al. |
| 8,635,818 | B2 | 1/2014 | Wildes |
| 9,136,792 | B2 | 9/2015 | Tomlinson |
| 9,163,375 | B2 | 10/2015 | Ayers et al. |
| 9,587,364 | B2 | 3/2017 | Ayers et al. |
| 10,581,374 | B2 | 3/2020 | Urrutia et al. |
| 2011/0194900 | A1 | 8/2011 | French, Sr. |
| 2011/0197524 | A1 | 8/2011 | Sahlin et al. |
| 2011/0277296 | A1 | 11/2011 | Ramos |
| 2011/0277806 | A1 | 11/2011 | Gillenwater |
| 2012/0064263 | A1 | 3/2012 | Ayers et al. |
| 2013/0056595 | A1* | 3/2013 | Tomlinson ............ H02S 20/00 248/176.1 |
| 2013/0299655 | A1 | 11/2013 | Sader |
| 2015/0040969 | A1 | 2/2015 | Wildes |
| 2015/0331972 | A1 | 11/2015 | McClure et al. |
| 2017/0111006 | A1* | 4/2017 | Vietas .................... F24S 25/30 |
| 2018/0131316 | A1 | 5/2018 | Urrutia et al. |

OTHER PUBLICATIONS

AGRU America, Inc., Concrete Protection, Brochure-CPL-Agru-6.pdf, page from https://web.archive.org/web/20170701203023/http://agruamerica.com/wp-content/uploads/2016/08/Brochure-CPL-Agru-6.pdf, Jul. 1, 2017; AGRU America, Inc., Georgetown, SC 29440.

AGRU America, Inc., Concrete Protection, Brochure-CPL-Agru-6.pdf, printed from https://web.archive.org/web/20170701203023/http://agruamerica.com/wp-content/uploads/2016/08/Brochure-CPL-Agru-6.pdf, Jul. 1, 2017; AGRU America, Inc., Georgetown, SC 29440.

AGRU America, Inc., High Density Polyethylene Sure Grip® CPL With Ultra Grip Anchors Yellow, Jun. 2015, printed from https://web.archive.org/web/20171219102515/http://agruamerica.com/wp-content/uploads/2017/04/Sure-Grip-UG-CPL-Yellow-Data-Sheet-2017.pdf; AGRU America, Inc., Georgetown, SC 29440.

AGRU America, Inc., Tunnels, www.agruameric.com/applicaiton/tunnels, printed from https://web.archive.org/web/20170606024400/http://agruamerica.com/application/tunnels/, Jun. 6, 2017; AGRU America, Inc., Georgetown, SC 29440.

Watershed Geosynthetics LLC, "ClosureTurf Sliding Slope Stable Slope", printed from web.archive.org/web/20170710015449/http://watershedgeo.com/closureturf/, Jul. 10, 2017; Watershed Geosynthetics LLC, Alpharetta, Georgia 30022.

Watershed Geosynthetics LLC, "ClosureTurf", page printed from web.archive.org/web/20170710015449/http://watershedgeo.com/closureturf/, Jul. 10, 2017; Watershed Geosynthetics LLC, Alpharetta, Georgia 30022.

Watershed Geosynthetics LLC, "Hydroturf® Hydrobinder® Infill Specification", Jun. 2016; Watershed Geosynthetics LLC, Alpharetta, Georgia 30022.

Watershed Geosynthetics LLC, "VERSACAP—An Intermediate Cover that improves the environment and saves money", page printed from web.archive.org/web/20151016211028/http7/watershedgeo.com/wp-conte . . . , Oct. 16, 2015; Watershed Geosynthetics LLC, Alpharetta, Georgia 30022.

Watershed Geosynthetics LLC, "VERSACAP—An Intermediate Cover that improves the environment and saves money", printed from web.archive.org/web/20151016211028/http://watershedgeo.com/wp-conte . . . , Oct. 16, 2015; Watershed Geosynthetics LLC, Alpharetta, Georgia 30022.

Watershed Geosynthetics LLC, ClosureTurf Solar, printedfromweb.archive.org/web/20160211182912/http://watershedgeo.com/closureturf/closureturf-solar/, Feb. 11, 2016; Watershed Geosynthetics LLC, Alpharetta, Georgia 30022.

Watershed Geosynthetics LLC, Innovative Approach to Landfill Design Allows for Benchless Caps, Mar. 30, 2017, printed from https://watershedgeo.com/innovative-approach-to-landfill-design-allows-for-benchless-caps/Watershed Geosynthetics LLC, Alpharetta, Georgia 30022.

Watershed Geosynthetics LLC, VersaCap, printed from web.archive.org/web/20160402084816/http://watershedgeo.com/versacap/, Apr. 2, 2016; Watershed Geosynthetics LLC, Alpharetta, Georgia 30022.

* cited by examiner

INTEGRATED PHOTOVOLTAIC MODULE MOUNTING SYSTEM FOR USE WITH TUFTED GEOSYNTHETICS

CROSS REFERENCE TO RELATED APPLICATIONS

This application claims the benefit of U.S. Provisional Patent Application Ser. No. 62/522,402 filed Jun. 20, 2017 and entitled Integrated Photovoltaic Module Mounting System For Use With Tufted Geosynthetics.

STATEMENT REGARDING FEDERALLY SPONSORED RESEARCH OR DEVELOPMENT

Not applicable.

TECHNICAL FIELD

This invention relates to an integrated mounting system for photovoltaic modules for use in solar energy collection. In a more specific aspect, this invention relates to a non-ballasted and non-ground penetrating integrated photovoltaic mounting system for use with, and supported by, tufted geosynthetics.

In this application, the following terms will be understood to have the indicated definitions:

"photovoltaic module"—a module which utilizes the generation of voltage when radiant energy (such as solar energy) falls on the module; sometimes referred to as a solar cell.

"tufted geosynthetics"—a system which is adapted to cover waste sites and other environmental closures and which is generally comprised of synthetic grass having synthetic fibers tufted to a backing and a geomembrane. Examples of a tufted geosynthetic cover system are shown in Ayers and Urrutia U.S. Pat. Nos. 7,682,105 and 9,163,375. The term "tufted geosynthetics" is also used to refer to a synthetic turf cover system.

"synthetic grass"—refers to a composite which comprises at least one geotextile (woven or nonwoven) tufted with one or more synthetic yarns or strands and which has the appearance of grass.

"geomembrane"—refers to a polymeric material, such as high density polyethylene, very low density polyethylene, linear low density polyethylene, polyvinyl chloride, etc.

"surface"—refers to a surface which has an angle of slope of zero or more.

"creep"—refers to a behavior of materials (such as soils and geosynthetics) to move or deform slowly under a constant load or stress.

BACKGROUND OF THE INVENTION

Photovoltaic solar modules have historically been mounted by use of a rigid racking system over a variety of surfaces such as rooftops, greenfields and brownfields. These rigid racking systems have not been integrated onto the photovoltaic module. Typical systems include racking structures that the photovoltaic module must be placed upon and then mechanically fastened to the racking structure.

Racking structures are placed in spaced-relation and the racking structures enable orienting the photovoltaic module at an energy-generating efficient angle. However, the spacing limits the number of photovoltaic modules that can be installed in an area because the angling causes shadows. An adjacent rack must be spaced sufficiently that the photovoltaic modules are not within a shadow area.

There is a need in the solar industry for an integrated photovoltaic module in which the mounting mechanism is attached to the photovoltaic module which eliminates the need for a rigid racking system. The integration allows for an economical alternative to a traditional rigid racking system and enables the increasing of the density of the photovoltaic modules placed at a solar energy generation site, thereby increasing the potential generation of electrical power while allowing flexibility of installation by non-traditional racking installers.

While use of solar as a renewable alternative energy source has "clean energy" favorabilities, there are drawback to such installations. Solar energy generation sites typically require large tracts of land. In some location circumstances, wooded lands are cleared or farm lands are re-purposed for use as solar energy generation sites. Other sites are significantly remote from tie-in connections to the power transmission and distribution grid of power generating and supply companies. These remote sites require capital expenditures to install and maintain transmission lines to the electrical grid and such transmission lines occupy additional land. Also, recent changes in power generation capacity has decreased reliance on coal and increased reliance on cleaner combustion fuels such as natural gas and, alternatively, power plants that generate electricity with turbines operated with steam heated by nuclear fuel sources. The coal-fired power plants nevertheless have large areas of ash holding ponds or storage areas. These areas are subject to closing with covers such as geomembranes that restrict environmental waters, such as rain or other precipitation or surface water flow, from passing through the covered site and leaching into the ground or pond.

Accordingly, there is a need in the art for an improved integrated mounting system for securing photovoltaic modules to a surface for generating solar power. It is to such that the present invention is directed.

SUMMARY OF THE INVENTION

The integrated mounting system of this invention allows for easy installation supported by a tufted geosynthetic on a surface. This combination of the integrated mounting system and tufted geosynthetic results in a lower cost, lower maintenance of the surrounding surface, adaptable for variety of grades from flat to sloping ground and generates more solar power per unit area.

Briefly described, the present invention integrates a photovoltaic module mounting system over tufted geosynthetics on various surfaces (such as a ground cover system, roof, reservoir, pond, etc.). There are two preferred components of this invention that may be combined or used separately within the integrated photovoltaic module mounting system and within any combination thereof.

The first component is one or more anti-creep strip(s) that enhances interface friction between the photovoltaic module and the tufted geosynthetic, while also reducing shearing forces between the photovoltaic module and its mounting surface, thus preventing or substantially preventing sliding forces from mobilizing the module. If desired, a monitoring device can be used to measure the amount of creep.

The second component is a flexible attachment connection which is used, in addition to the anti-creep strip(s), as an additional factor of safety to increase interface friction and to counter potential shearing and uplift forces which could be caused by high wind gusts. The attachment connection can be welded directly to the tufted geosynthetic or the geomembrane and attached to the bottom, top or side of the photovoltaic module. Other means of attaching the connection to the geosynthetic include mechanical means (e.g., screws, bolts, etc.) and adhesive means such as glue, tape, etc.

These two components eliminate the need for ballast compared to a traditional photovoltaic racking system which does not have foundation anchoring. The integrated photovoltaic module mounting system supported by a tufted geosynthetic requires no ballast on a surface. These two components enable multiple configurations (as shown in the drawings).

The result of a non-ballasted integrated photovoltaic module mounting system allows for a lower cost and increased power generation through higher density of module placement. An additional advantage of an integrated photovoltaic module mounting system is that the system does not require grounding.

The integrated photovoltaic module mounting system of this invention allows for a higher density (i.e., one or more) of photovoltaic modules in a defined area as compared to traditional systems, and a higher density of modules enables the integrated photovoltaic module mounting system to provide more electrical power per unit area.

More particularly recited, the present invention meets a need in the art by providing an apparatus for mounting a photovoltaic module to a tufted geosynthetic cover overlying a surface, comprising one or more anti-creep strips for engaging with a photovoltaic module, the anti-creep strip having a plurality of spaced-apart projections extending from a surface opposing the attachment with the photovoltaic module, whereby the projections being disposed within tufts of the tufted geosynthetic, frictionally secures the photovoltaic module attached to the anti-creep strip to the tufted geosynthetic cover.

In another aspect, the present invention further comprises a plurality of flexible attachment connectors, each for attaching at a first portion to the photovoltaic module and for attaching at a second portion to the tufted geosynthetic cover. The flexible attachment connector, being attached to the photovoltaic module and attached to the tufted geosynthetic cover overlying a surface, secures the photovoltaic module to the tufted geosynthetic cover.

In another aspect, the present invention provides a method of mounting a photovoltaic module to a tufted geosynthetic cover overlying a surface, comprising the steps of:

(a) engaging one or more anti-creep strips with a photovoltaic module, the anti-creep strip having a plurality of spaced-apart projections extending from a surface opposing the attachment with the photovoltaic module, and (b) disposing the photovoltaic module over a portion of the tufted geosynthetic cover, whereby the projections being disposed within tufts of the tufted geosynthetic cover, frictionally secures the photovoltaic module attached to the anti-creep strip to the tufted geosynthetic cover.

In yet a further aspect, the method of the present invention further comprises the step of attaching a plurality of flexible attachment connectors between the photovoltaic module and a tufted geosynthetic cover, each flexible attachment connector for attaching at a first portion to the photovoltaic module and for attaching at a second portion to the tufted geosynthetic cover, whereby the flexible attachment connector, being attached to the photovoltaic module and attached to the tufted geosynthetic cover secures the photovoltaic module to the tufted geosynthetic cover.

In yet another aspect, the present invention provides an apparatus for mounting a photovoltaic module to a tufted geosynthetic cover overlying a surface, comprising a plurality of flexible attachment connectors, each for attaching at a first portion to the photovoltaic module and for attaching at a second portion to the tufted geosynthetic cover, whereby the flexible attachment connector, being attached to the photovoltaic module and to the tufted geosynthetic cover, secures the photovoltaic module to the tufted geosynthetic cover.

In a further aspect, the present invention provides a method of mounting a photovoltaic module to a tufted geosynthetic cover overlying a surface, comprising the steps of:

(a) attaching a plurality of flexible attachment connectors to the photovoltaic module, each flexible attachment connector having a first portion configured for attaching to the photovoltaic module; and (b) attaching a second portion of the flexible attachment connectors to the tufted geosynthetic cover, whereby the flexible attachment connector, being attached to the photovoltaic module and to the tufted geosynthetic cover, secures the photovoltaic module to the tufted geosynthetic cover.

Objects, advantages and features of the present invention will become apparent upon a reading of the following detailed description in conjunction with the drawings and the appended claims.

DETAILED DESCRIPTION

The present invention provides an integrated photovoltaic module mounting system for use with a tufted geosynthetic system on a surface without a racking structure and without ballast for support.

The essential components of this invention are a tufted geosynthetic system and one or more integrated photovoltaic module mounting systems.

Cover System

Examples of tufted geosynthetic systems useful in the integrated photovoltaic module mounting system of this invention are the covers marketed by Watershed Geosynthetics LLC under the registered trademarks CLOSURE-TURF and VERSACAP tufted ground cover systems. These covers 11 comprise a composite of at least one geotextile 213 which is tufted with a plurality of spaced-apart tufts 215 with one or more synthetic yarns (i.e., a tufted geosynthetic) to simulate grass blades in a synthetic grass, and an impermeable geomembrane 217 comprised of a polymeric material.

The synthetic grass blades of the system may contain an infill material and/or a material for protection of the synthetic grass blades against ultraviolet rays.

Solar Module

One or more mono- or multi-crystalline solar modules can be used in the integrated photovoltaic module mounting system of this invention, such as commercially available polycrystalline silicon solar modules. Examples of effective solar modules are available from BYD (China) under the designation BYD 260P6C-30-DG and from Trina (China) under the designation Solar Duomax TSM-PEG14, Tallmax PE14A, and BYD P6C-36. An alternate embodiment discussed below gainfully uses a bifacial solar module.

Figure 1:
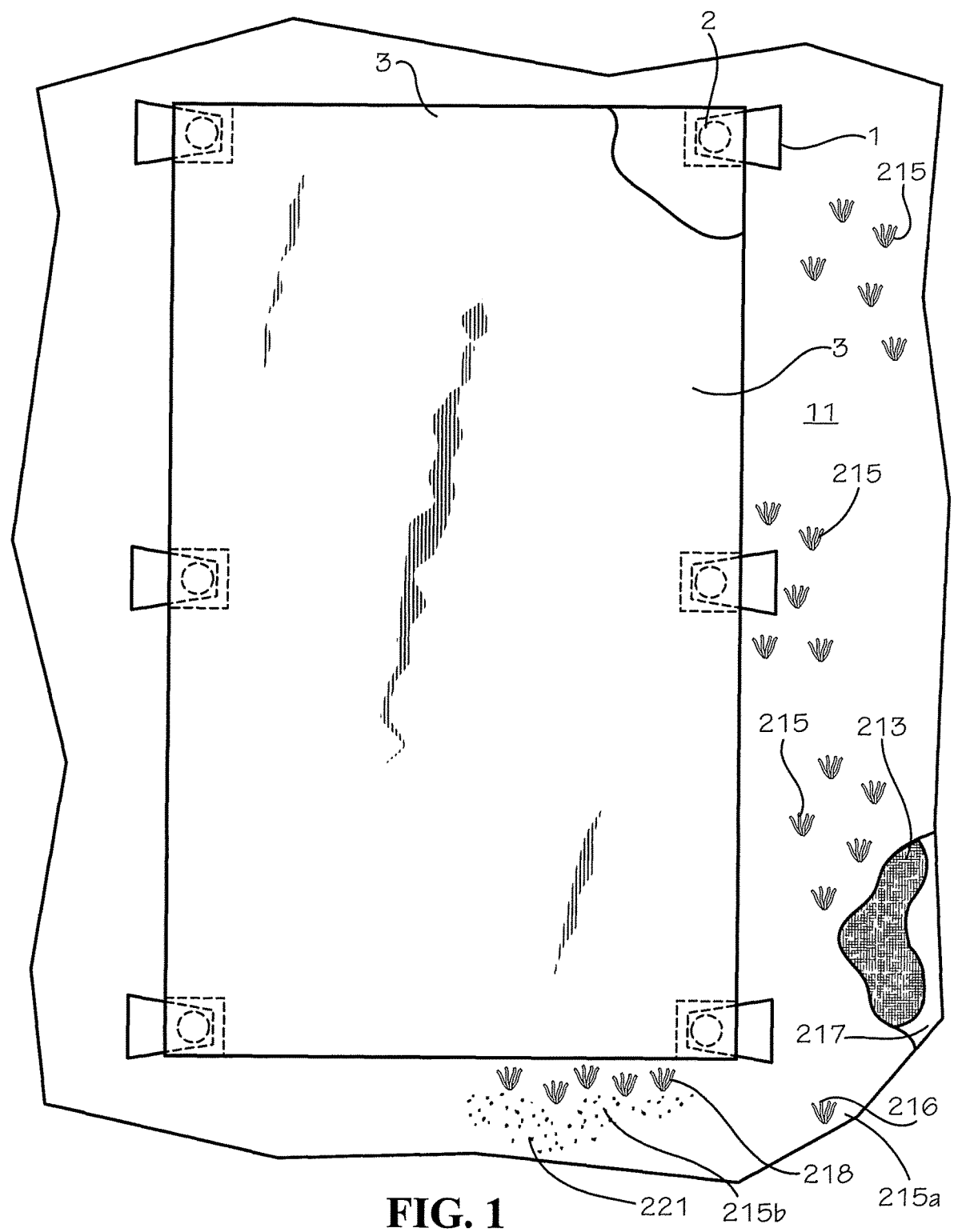
FIG. 1 shows multiple flexible attachment connections (i.e., single weld harnesses) mounted on a photovoltaic module.

Referring now to the drawings, in which like numerals represent like elements, FIG. 1 shows in top view multiple single weld harnesses 1 secured by a mounting baseplate 2 attached to a solar module 3. The weld harnesses 1 or tabs that extend flexibly laterally from a side edge of the solar module 3 and attach to at least some of the plurality of tufts 215. The attaching may be accomplished by mechanically attached such as with a fastener, chemically attached, welding (heat or sonic), or thermoset bonding.

Figure 1A:
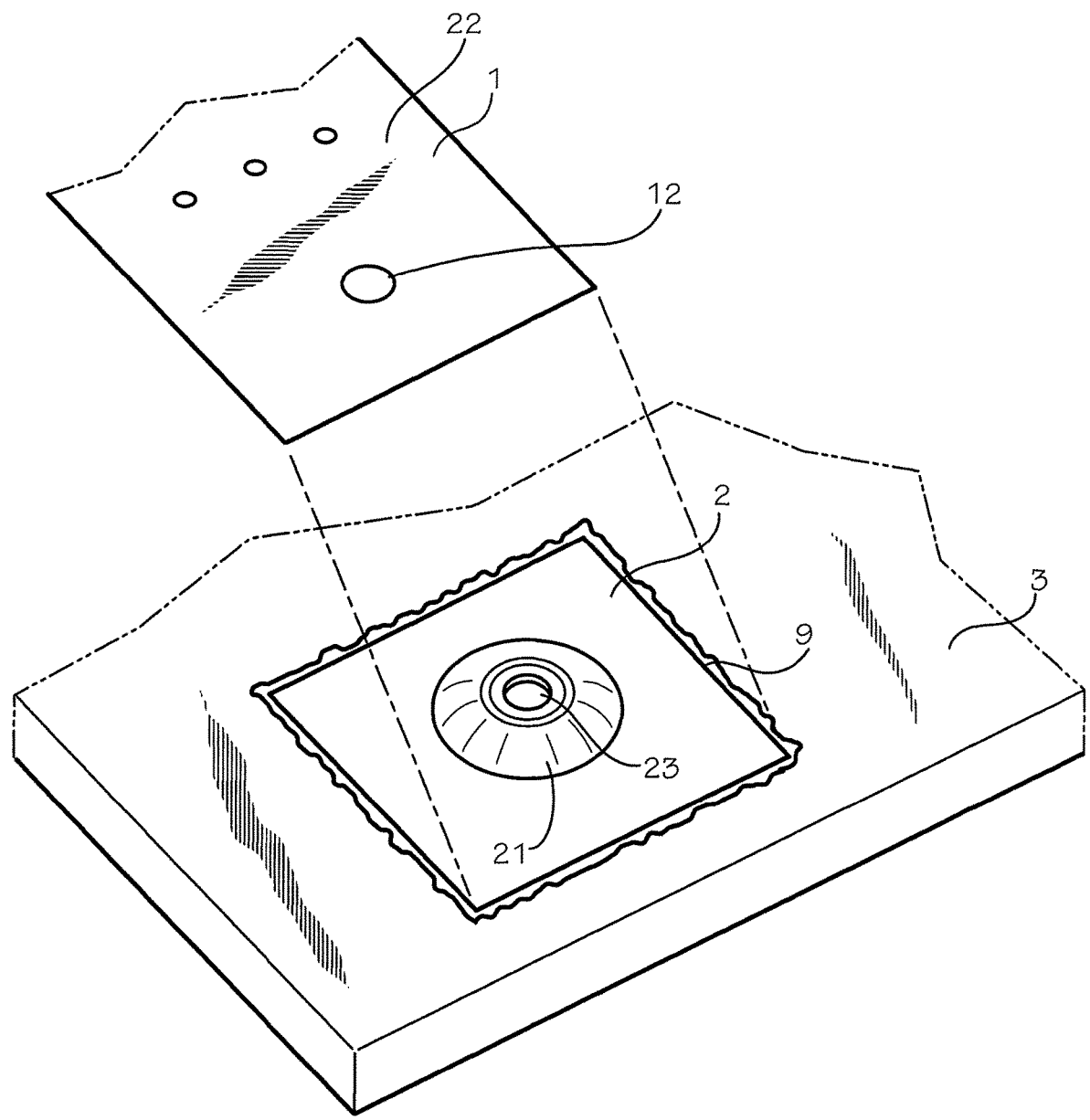
FIG. 1A shows a detailed bottom view of a single flexible attachment connection exploded away from a mounting baseplate attached to photovoltaic solar module.

FIG. 1A shows a detailed bottom view in which a single flexible weld harness 1 is exploded away from the mounting baseplate 2 that attaches, such as with adhesive 9, to a bottom surface of the photovoltaic solar module 3. The flexible weld harness 1 has a first portion 19 that defines an opening 12 for receiving a fastener such as a screw or bolt that engages a threaded passage 23 in the baseplate 2. The threaded passage 23 extends in a raised spacer portion 21 of the baseplate 2, such as a nut mounted therein. A second portion 22 of the flexible attachment connection 1 extends laterally as a flap to overlie and connect (by mechanically linking with a fastener, chemically connecting, heat or sonic welded, thermoset bond or attached, or adhesive) to a portion of a tufted geosynthetic ground cover 11.

Figure 2:
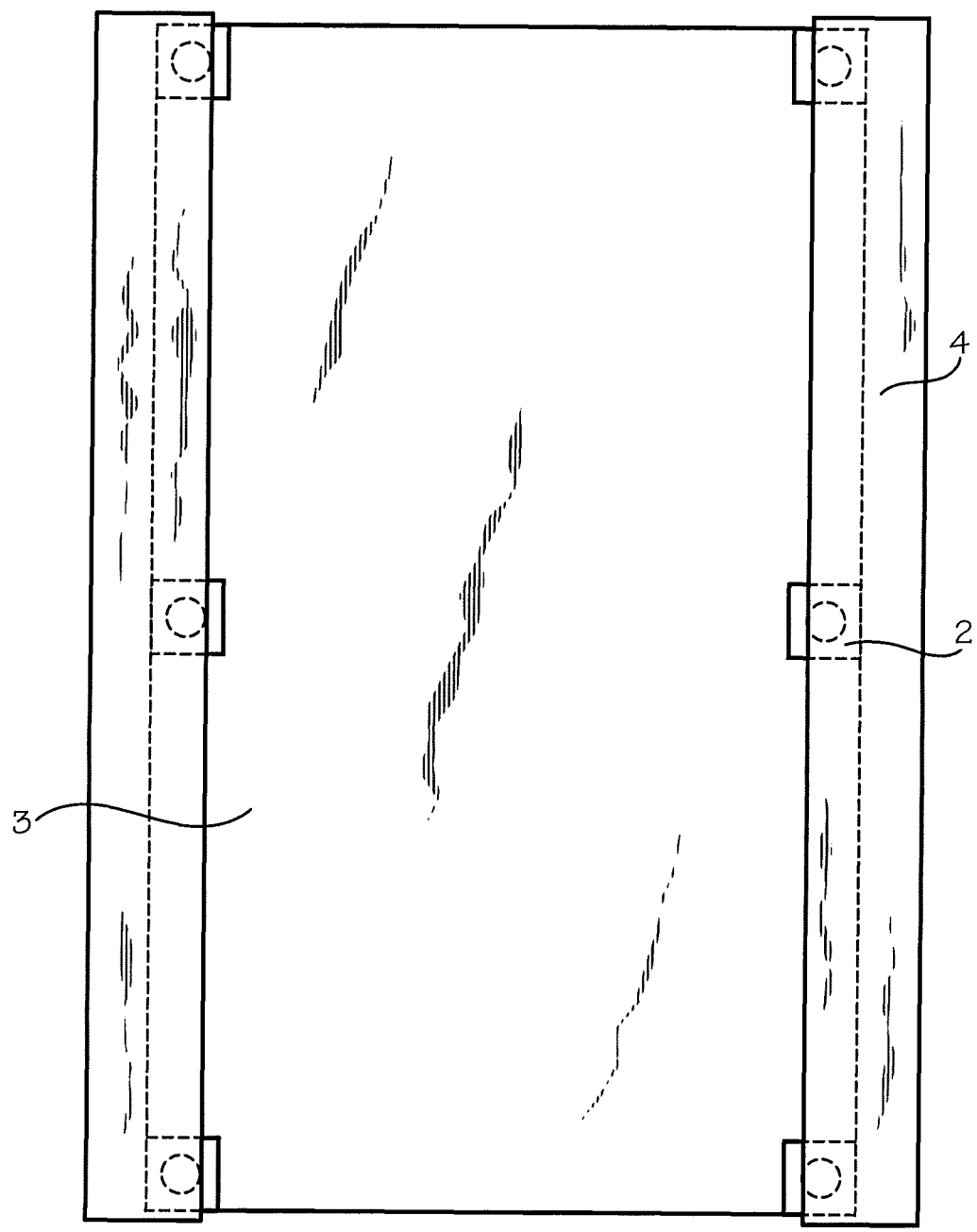
FIG. 2 is a view of multiple weld harness strips mounted on a photovoltaic module.

Instead of a tab 1 for the weld harness, FIG. 2 shows multiple elongated weld harness strips 4 secured by the respective mounting baseplates 2 attached to the solar module 3.

Figure 3:
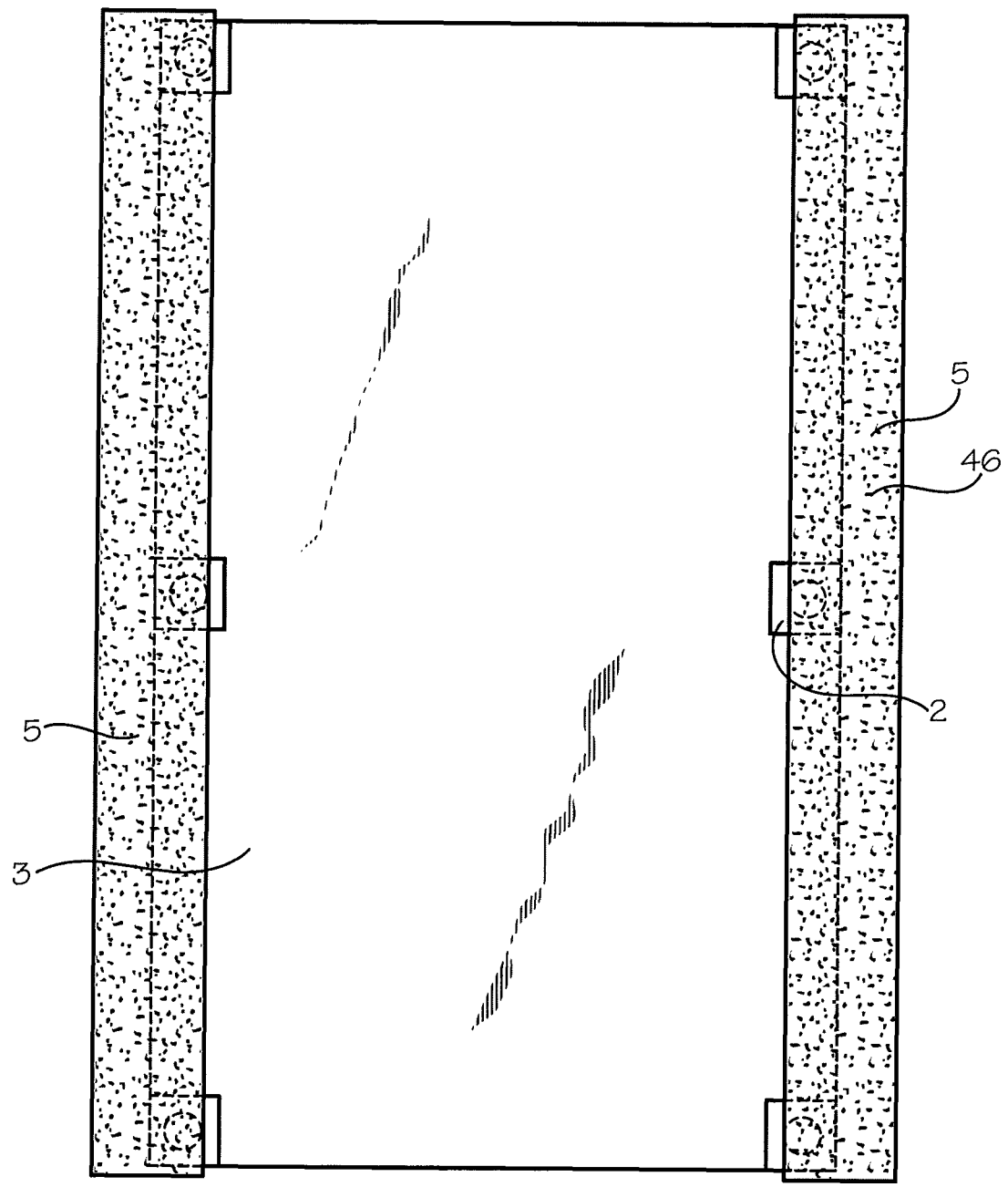
FIG. 3 is a view of two anti-creep strips mounted on a photovoltaic module.

FIG. 3 shows two anti-creep strips 5 secured by the respective mounting baseplates 2 attached to solar module 3.

Figure 4:
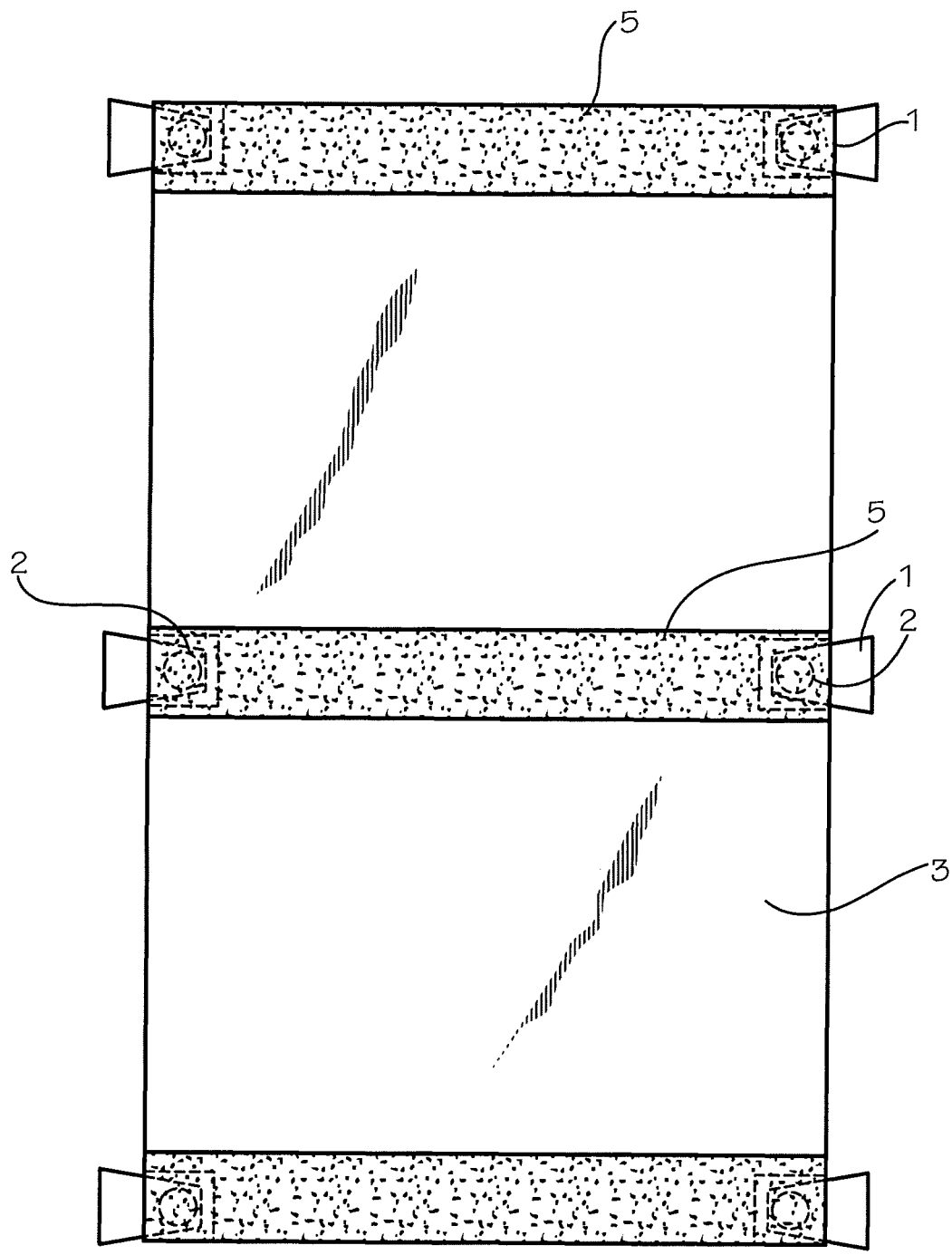
FIG. 4 is a view of multiple single weld harnesses used with multiple anti-creep strips.

FIG. 4 shows multiple single weld harnesses 1 in combination with anti-creep strips 5, both secured by mounting baseplate 2 attached to solar module 3.

Figure 5A:
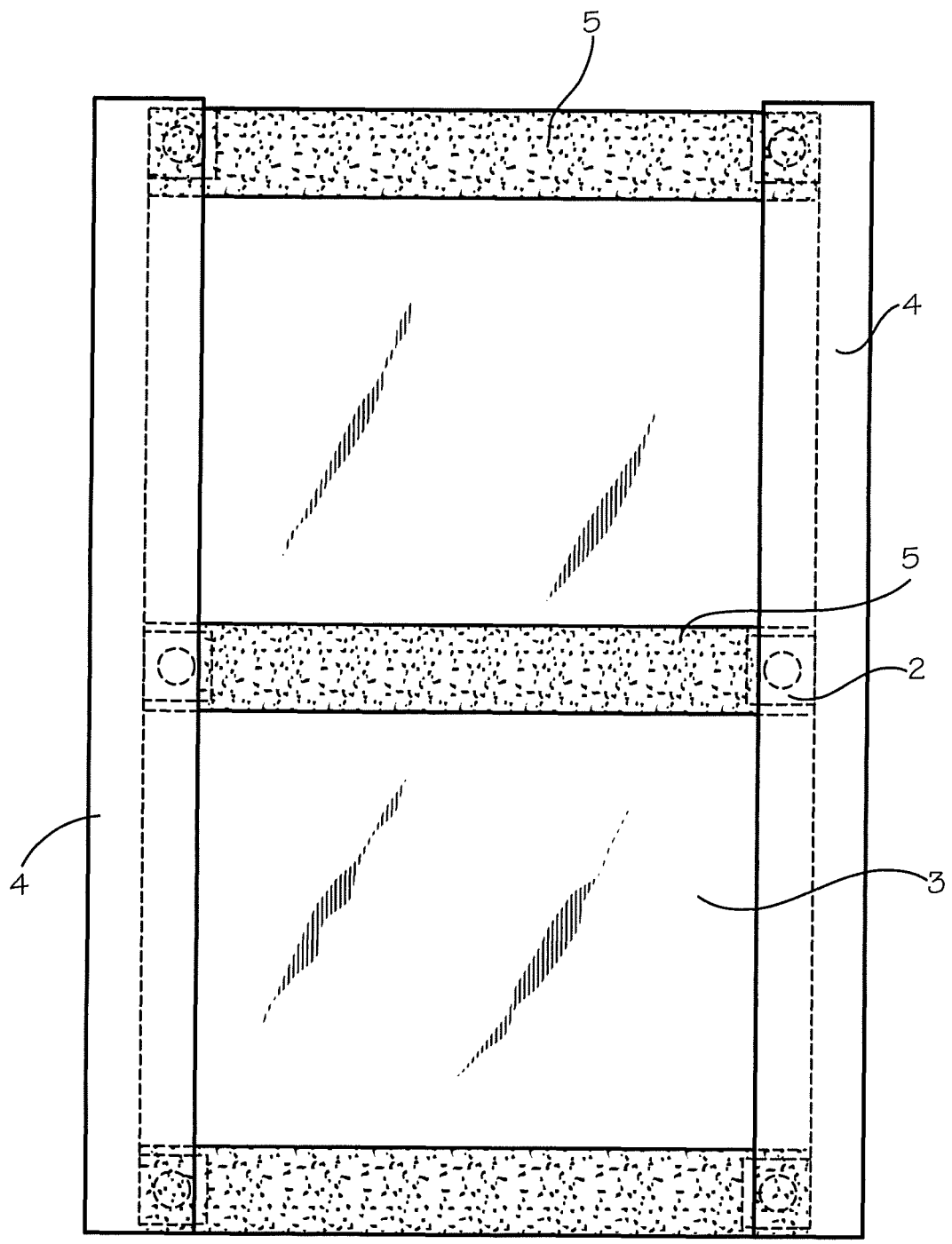
FIG. 5A is a view of two weld harness strips used with multiple anti-creep strips.

FIG. 5A shows two weld harness strips 4 in combination with anti-creep strips 5 secured by mounting baseplate 2 attached to solar module 3.

Figure 5B:
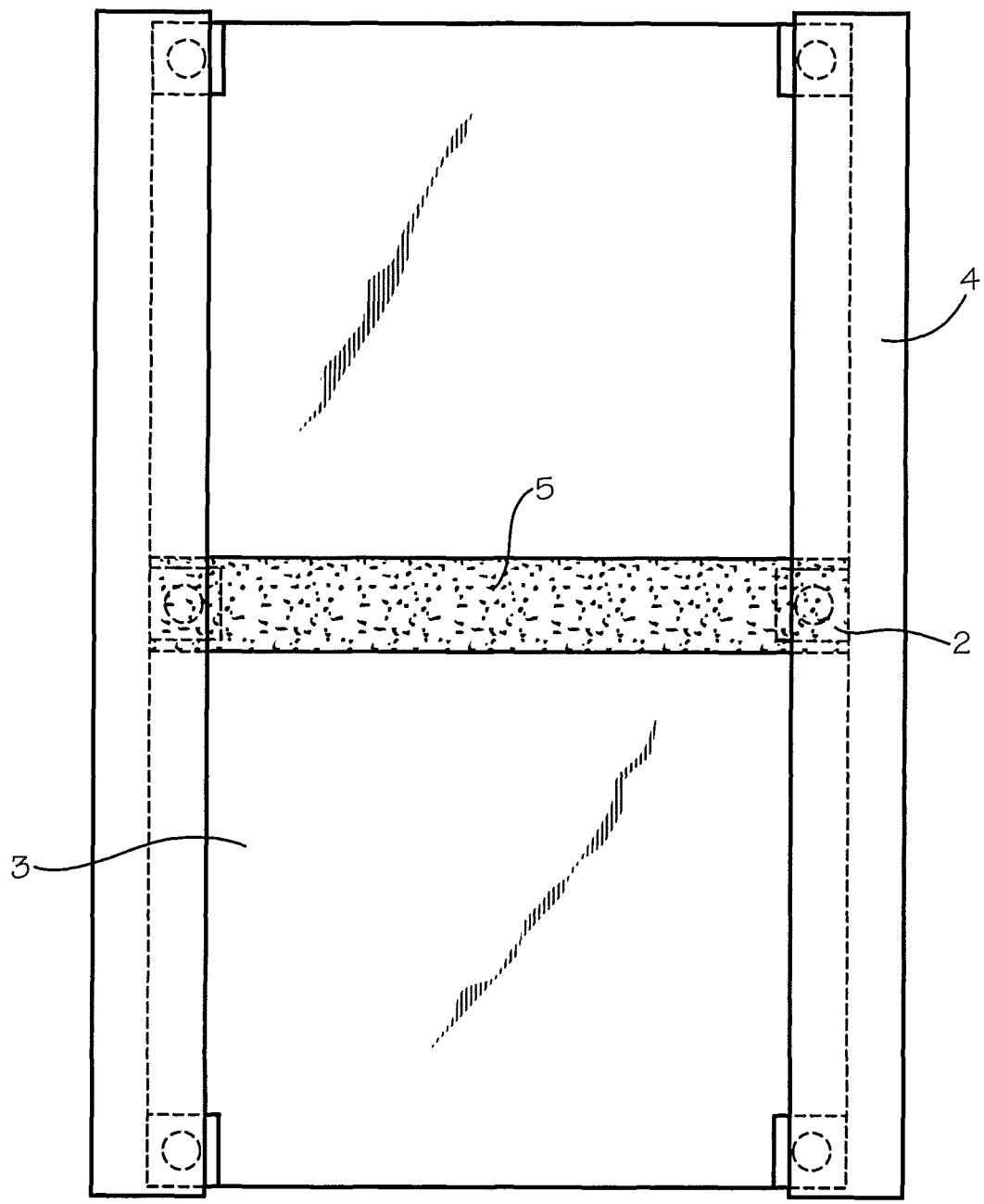
FIG. 5B shows two weld harness strips used with a single anti-creep strip.

FIG. 5B shows two weld harness strips 4 used with single anti-creep strip 5 secured by mounting baseplate 2 attached to solar module 3.

Figure 5C:
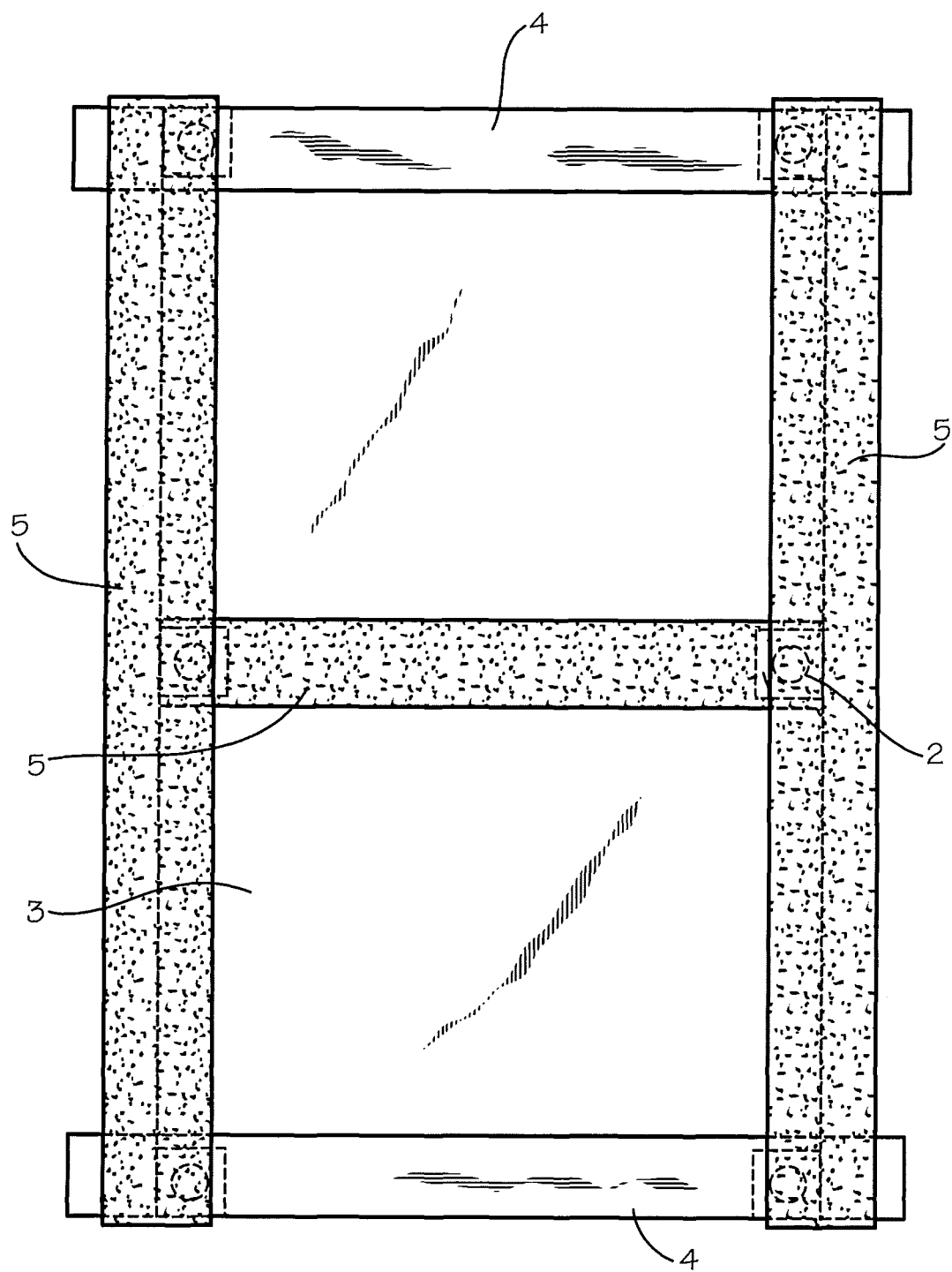
FIG. 5C shows two weld harness strips used with multiple anti-creep strips and multiple single weld harnesses.

FIG. 5C shows two weld harness strips 4 used with multiple anti-creep strips 5 and secured by mounting baseplate 2 attached to solar module 3.

Figure 6:
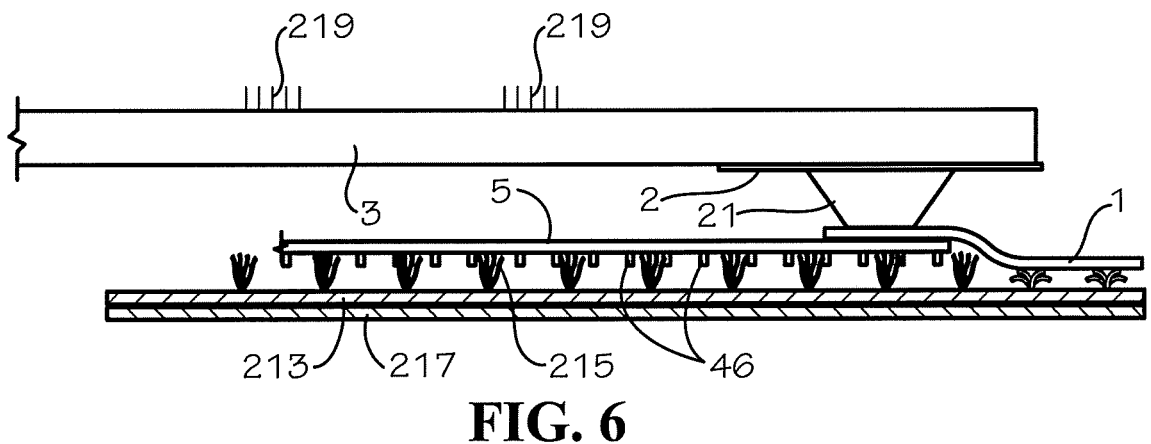
FIG. 6 shows a cross section of a single weld harness strip used with a photovoltaic module.

FIG. 6 shows a side elevational view of a single weld harness 1 secured to solar module 3.

Figure 6A:
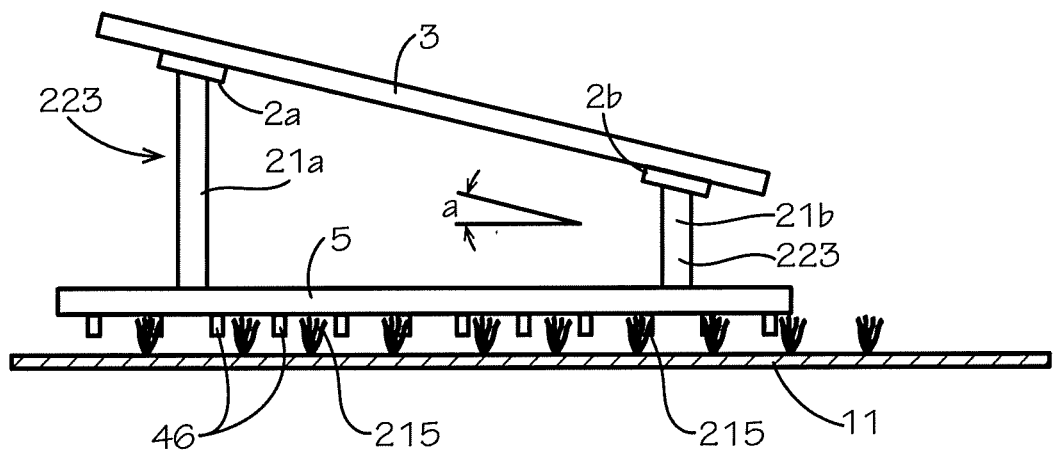
FIG. 6A illustrates in side elevational view an embodiment of the photovoltaic module mounting system using a tilting device for selective orienting at an angle to the geosynthetic for optimal positioning relative to the sun for energy generation.

FIG. 6A illustrates in side elevational view an embodiment of the photovoltaic module mounting apparatus using a tilting device generally 223 for selective orienting of the photovoltaic module 3 at an angle a to the geosynthetic cover 11 for optimal positioning relative to the sun for energy generation.

Figure 7:
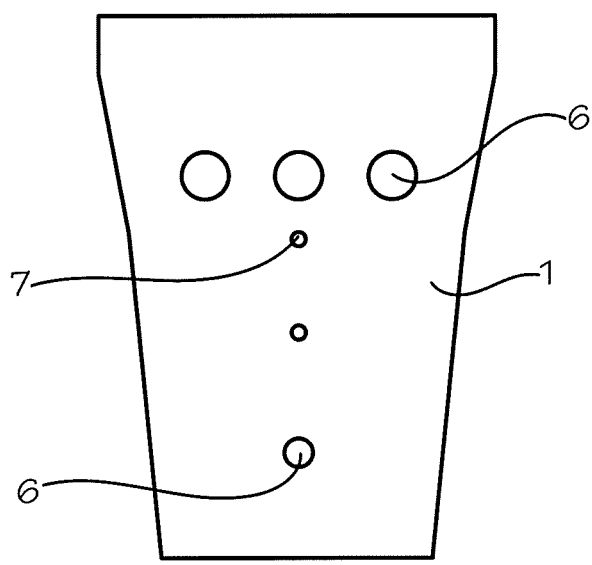
FIG. 7 shows a top view of a single weld harness.

FIG. 7 shows a top view of a single weld harness 1 having a single weld attachment in combination with wind disturbing openings 6 and openings 7 for attaching optional mechanical connections.

Friction

This invention also provides a method for a non-ballasted module mounting system utilizing one or more anti-creep strips 5 integrated on the photovoltaic module when mounted over tufted geosynthetics, by increasing the coefficient of friction between the anti-creep strips and the tufted geosynthetic. The anti-creep strips 5 include a plurality of spaced-apart feet 46 depending from a bottom surface. The feet 46 inter-engage with the tufts 215 to provide frictional connection of the photovoltaic solar module 3 to the tufted geosynthetic cover 11. In the illustrated embodiment, the anti-creep strips 5 connect to the mounting plate 2 using a threaded fastener to engage the threaded passageway 23 in the baseplate 2. In embodiments that uses both the anti-creep strips 5 and the weld harness 1 (or elongated attaching strip 4), the fastener extends through the anti-creep strip and the weld harness and threadably engages the passage 23. Alternatively, separate, or additional baseplates 2 may be used.

The anti-creep strips footing is generally a structured geomembrane or tufted geosynthetic cover 11.

The anti-creep strips, when used in this invention, comprise a polymeric material such as polyethylene, polypropylene, ethylene propylene diene monomer, rubber, metal, textured metal, polyvinyl chloride, polyurethane, etc.

Further, an alternate embodiment may charge the geosynthetic cover 11 with ballast infill 221, to provide a mass that increases the frictional resistance to movement with the plurality of particles of the infill that fill interstices and spaces above the geotextile 213 and among the tufts 215. When used in this invention, suitable materials for infill are sand, concrete and materials available from Watershed Geosynthetics LLC (Alpharetta, Ga.) under the trademarks HYDROBINDER and ARMORFILL infill ballast materials. Infill can be of various colors, sizes and textures.

When used in this invention, examples of suitable materials for anti-creep strips are calendared, textured and structural membranes made by Agru America, Inc. under the trademark SURE GRIP concrete protective liner.

When used in this invention, examples of suitable materials for anti-creep strips are calendared, textured and structural membranes made by Agru America, Inc. under the trademark SureGripnet.

Wind Uplift Resistance

The present invention comprises a wind-resistant non-ballasted integrated photovoltaic module mounting system for use on a tufted geosynthetic, which preferably includes both anti-creep strips and an attachment layer. The system does not rely on weight to resist wind forces, but instead relies on wind-breaking turf blades (i.e., the synthetic grass) and an attachment to the turf blades (synthetic grass). The cover of the present invention can be deployed over a large area with very minor ballasting. Wind-breaking elements 219 may also be utilized to break up the airflow over the integrated photovoltaic module to provide wind uplift resistance. As illustrated in FIG. 6, one or more wind breaking elements generally 219 may attach to an edge of the photovoltaic module 3. The wind breaking elements 219 comprise a plurality of thin spaced-apart pins that extend upwardly, for example, about 1-12 inches, preferably about 2-6 inches, and more preferably, about 2-3 inches. In an alternate embodiment, the weld harness 4 may include wind breaking or disturbing openings 6.

With this invention, the wind velocity on the impermeable surface (geomembrane) becomes turbulent near the surface of the cover, thus greatly reducing the actual wind velocity at the liner surface and decreasing associated uplift. The reaction of the synthetic grass of the tufted geosynthetic to the wind forces can also create a downward force on the geomembrane. This reaction is caused by the filaments of the synthetic grass applying an opposing force against the wind which is transferred as a downward force on the geomembrane.

The integrated photovoltaic module of this invention can be used with an optional tilting device to raise or lower the module for better results depending on the location. FIG. 6A illustrates in side elevational view an embodiment of the photovoltaic module mounting apparatus using the tilting device generally 223 for selective orienting of the photovoltaic module 3 at an oblique angle a relative to the geosynthetic cover 11 for optimal positioning relative to the sun for energy generation. The tilting device 223 comprises at least a pair of the mounting base plates 2a, 2b having riser portions 21a, 21b of different lengths, whereby the photovoltaic module 3 is disposed at the angle a to the geosynthetic cover 11, for optimal energy generation.

Further, the mounting baseplate 2 spaces the photovoltaic solar module 3 from the tufted geosynthetic ground cover 11. The spacing thereby creates a gap between the tufted geosynthetic ground cover and the photovoltaic solar module 3, which gap facilitates air flow therealong for heat dissipation in that heating of the photovoltaic solar module 3 which occurs reduces the solar generation efficiency of the solar module. In an alternate embodiment, the mounting base plate 2 is sized to provide at least an 18 inch to 24 inch gap under the photovoltaic solar module 3. To further enhance solar generation energy capacity, the photovoltaic solar module 3 is bifacial and the tufted geosynthetic ground cover 11 includes light reflective features, such reflectants added into the polymeric used the extrusion of the yarn from which the tufts 215 are formed during tufting. As shown in FIG. 1, tuft 215a illustrates a reflectant 216, for example, a small light-reflecting body or chip. Further, a light reflective color pigment material may be included in the polymeric to enhance reflectivity of ambient light from the tufted geosynthetic ground cover 11 proximate the photovoltaic solar module 3. For example, tufts 215b are tufted with yarns that include a coloring pigment 218.

This invention has been described with particular reference to certain embodiments, but variations and modifications can be made without departing from the spirit and scope of the invention.

What is claimed is:

1. An energy generation system having a photovoltaic module mounted to a tufted geosynthetic cover overlying a surface, comprising:
 a tufted geosynthetic ground cover having a backing tufted with a yarn that disposes a plurality of spaced-apart tufts extending from an upper surface of the backing, each tuft having a plurality of slender elongated yarn portions simulating blades of an artificial grass, the tufted geosynthetic ground cover overlying a surface with the tufts extending in a first direction therefrom;
 a pair of anti-creep strips disposed in spaced-apart relation on the plurality of tufts, each anti-creep strip comprising an elongated member and having:
  a plurality of spaced-apart feet extending from a bottom surface, wherein each of the spaced-apart feet contactingly frictionally engage a respective one or more adjacent ones of the plurality of tufts; and
 the anti-creep strips for receiving a respective one of a plurality of fasteners therethrough;
 a photovoltaic module having a plurality of base plates attached in spaced-apart relation for aligning each base plate with a respective portion of one of the anti-creep strips;
 at least one elongate attaching harness having an opening for aligning with a respective base plate, said attaching harness disposed between an upper surface of the anti-creep strip and secured by the fastener connecting the anti-creep strip to the respective base plate, and having an elongated flap portion extending laterally therefrom, said flap portion attached to a respective plurality of the plurality of tufts lateral of the photovoltaic module,
 whereby the photovoltaic module generates energy upon exposure to ambient light while the plurality of feet frictionally secures the photovoltaic module attached through the anti-creep strips to the tufted geosynthetic cover and cooperatively with the flap portion, resist wind uplift of the photovoltaic module.

2. The energy generation system as recited in claim 1, wherein the flap portion attaches to the respective plurality of the plurality of tufts mechanically, chemically, heat or sonic welding, or thermoset bonding.

3. The energy generation system as recited in claim 1, wherein the attaching harness comprise an elongate strip of a material suitable for welding to the tufted geosynthetic cover.

4. The energy generation system as recited in claim 1, wherein the tufts further comprise a light reflective element.

5. The energy generation system as recited in claim 1, further comprising
 an infill of granular material received within a plurality of interspatial gaps between the extending plurality of tufts and the backing.

6. The energy generation system as recited in claim 1, wherein the yarn includes a reflective additive.

7. The energy generation system as recited in claim 1, wherein the yarn includes a light reflective pigment.

8. The energy generation system as recited in claim 1, further comprising a wind breaking element.

9. The energy generation system as recited in claim 8, wherein the wind breaking element comprises a plurality of pins extending upwardly.

10. The energy generation system as recited in claim 8, wherein the wind breaking element comprises a portion of the attaching harness defining at least one opening.

11. The energy generation system as recited in claim 1, further comprising a tilting device mounted to an edge portion of the photovoltaic module, whereby the photovoltaic module is oriented at a selected angle relative to the geosynthetic cover for generation of electricity.

12. A method of generating energy with a photovoltaic module frictionally connected by a mount to a tufted geosynthetic cover overlying a surface, comprising the steps of:
(a) disposing a tufted geosynthetic cover over a surface, said tufted geosynthetic cover having a backing tufted with a yarn that disposes a plurality of spaced-apart tufts extending from an upper surface of the backing, each tuft having a plurality of slender elongated yarn portions simulating blades of an artificial grass, the tufted geosynthetic ground cover overlying a surface with the tufts extending in a first direction therefrom;
(b) engaging a pair of anti-creep strips with a photovoltaic module, the anti-creep strip for receiving a respective one of a plurality of fasteners therethrough for connecting to the photovoltaic module, said anti-creep strip further having a plurality of spaced-apart feet extending from a bottom surface opposing the photovoltaic module; and
(c) disposing the photovoltaic module over a portion of the tufted geosynthetic cover with the spaced-apart feet contactingly frictionally engaging a respective one or more adjacent ones of the plurality of tufts,
whereby the feet being disposed within the plurality of tufts of the tufted geosynthetic cover, frictionally secures the photovoltaic module attached to the anti-creep strips to the tufted geosynthetic cover and which photovoltaic module upon exposure to ambient light generates energy while the frictionally secured feet resist wind uplift forces on the photovoltaic module.

13. The method as recited in claim 12, further comprising the steps of:
attaching a plurality of flexible attachment connectors between the photovoltaic module and the tufted geosynthetic cover, each flexible attachment connector for attaching at a first portion to the photovoltaic module and for attaching at a second portion to the tufted geosynthetic cover,
whereby the flexible attachment connector, being attached to the photovoltaic module and to the tufted geosynthetic cover, further secures the photovoltaic module to the tufted geosynthetic cover.

14. The method as recited in claim 13, where attaching of the attachment connector to the tufted geosynthetic cover comprises mechanically attaching with a fastener, chemically attaching, welding (heat or sonic), or thermoset bonding.

15. The method as recited in claim 12, further comprising the step of distributing over the geosynthetic cover a ballast for filling a portion of a plurality of interstices between the plurality of tufts.

16. The method as recited in claim 12, further comprising the step of providing a wind breaking element.

17. The method as recited in claim 16, wherein the providing of the wind breaking element comprises the step of attaching to an edge of the photovoltaic module a plurality of spaced-apart pins that extend in a first direction away from the tufted geosynthetic cover.

18. The method as recited in claim 16, wherein the providing of the wind breaking element comprises forming an opening in a portion of the attaching connector.

* * * * *